(12) United States Patent
Zhou et al.

(10) Patent No.: US 12,247,399 B2
(45) Date of Patent: *Mar. 11, 2025

(54) FIRE-RESISTANT ROOF SYSTEM AND MEMBRANE COMPOSITE

(71) Applicant: Holcim Technology Ltd, Zug (CH)

(72) Inventors: Wensheng Zhou, Carmel, IN (US);
Michael J. Hubbard, Goshen, IN (US);
Allen Sopko, Zionsville, IN (US);
Joseph Carr, Indianapolis, IN (US)

(73) Assignee: Holcim Technology Ltd, Zug (CH)

( * ) Notice: Subject to any disclaimer, the term of this patent is extended or adjusted under 35 U.S.C. 154(b) by 629 days.

This patent is subject to a terminal disclaimer.

(21) Appl. No.: 17/505,030

(22) Filed: Oct. 19, 2021

(65) Prior Publication Data

US 2022/0034092 A1 Feb. 3, 2022

Related U.S. Application Data

(63) Continuation of application No. 16/665,765, filed on Oct. 28, 2019, now Pat. No. 11,168,479, which is a
(Continued)

(51) Int. Cl.
*E04D 5/10* (2006.01)
*B32B 27/12* (2006.01)
*B32B 37/04* (2006.01)
*D06N 5/00* (2006.01)
*E04B 1/94* (2006.01)
*E04D 5/06* (2006.01)
(Continued)

(52) U.S. Cl.
CPC ............... *E04D 5/10* (2013.01); *B32B 27/12* (2013.01); *B32B 37/04* (2013.01); *D06N 5/00* (2013.01); *E04B 1/941* (2013.01); *E04D 5/06* (2013.01); *E04D 5/149* (2013.01); *E04D 11/02* (2013.01); *E04D 13/00* (2013.01); *B32B 2307/3065* (2013.01); *D06N 2209/067* (2013.01); *Y10T 428/23921* (2015.04); *Y10T 428/249921* (2015.04)

(58) Field of Classification Search
None
See application file for complete search history.

(56) References Cited

U.S. PATENT DOCUMENTS 4,284,470 A 8/1981 Bondoc
4,491,617 A 1/1985 O'Connor et al.
(Continued)

FOREIGN PATENT DOCUMENTS

CN 101550729 A 10/2009
CN 101932438 A 12/2010
(Continued)

OTHER PUBLICATIONS

International Search Report for Appl. No. PCT/US2014/012732 dated Jul. 4, 2014.
(Continued)

*Primary Examiner* — Arti Singh-Pandey
(74) *Attorney, Agent, or Firm* — Arthur M. Reginelli; Renner, Kenner

(57) ABSTRACT

A roof assembly comprising: a roof deck; a thermoplastic membrane covering the deck; and a fabric having disposed thereon expandable graphite.

9 Claims, 4 Drawing Sheets

Related U.S. Application Data continuation of application No. 15/354,009, filed on Nov. 17, 2016, now abandoned, which is a continuation of application No. 14/162,273, filed on Jan. 23, 2014, now Pat. No. 9,523,203, which is a continuation-in-part of application No. 13/798,413, filed on Mar. 13, 2013, now abandoned.

(60) Provisional application No. 61/856,258, filed on Jul. 19, 2013, provisional application No. 61/755,666, filed on Jan. 23, 2013.

(51) Int. Cl.
*E04D 5/14* (2006.01)
*E04D 11/02* (2006.01)
*E04D 13/00* (2006.01)

(56) References Cited

U.S. PATENT DOCUMENTS

| | | | |
|---|---|---|---|
| 4,539,254 A | 9/1985 | O'Connor et al. | |
| 4,615,934 A | 10/1986 | Ellison | |
| 4,780,350 A | 10/1988 | O'Connor et al. | |
| 4,871,605 A | 10/1989 | Pagen et al. | |
| 4,996,812 A | 3/1991 | Venable | |
| 5,112,678 A | 5/1992 | Gay et al. | |
| 5,226,392 A | 7/1993 | Breuer et al. | |
| 5,314,556 A | 5/1994 | Woiceshyn | |
| 5,422,179 A | 6/1995 | Dietschi et al. | |
| 5,504,136 A | 4/1996 | Cavis et al. | |
| 5,516,817 A | 5/1996 | Slusher et al. | |
| 5,523,357 A | 6/1996 | Peterson | |
| 5,614,256 A | 3/1997 | Wierer et al. | |
| 5,757,592 A | 5/1998 | Arai et al. | |
| 5,981,030 A | 11/1999 | Haupt et al. | |
| 6,055,786 A | 5/2000 | Hubbard et al. | |
| 6,084,008 A | 7/2000 | Liu | |
| 6,207,085 B1 | 3/2001 | Ackerman | |
| 6,451,897 B1 | 9/2002 | Niyogi | |
| 6,502,360 B2 | 1/2003 | Carr et al. | |
| 6,506,842 B1 | 1/2003 | Heck et al. | |
| 6,544,596 B2 | 4/2003 | Clemens et al. | |
| 6,849,338 B2 | 2/2005 | Clemens et al. | |
| 7,070,844 B2 | 7/2006 | Bartek | |
| 7,300,892 B2 | 11/2007 | Porter | |
| 7,321,010 B2 | 1/2008 | Shooshtari et al. | |
| 7,338,702 B2 | 3/2008 | Swales et al. | |
| 7,429,544 B2 | 9/2008 | Grove et al. | |
| 7,473,440 B2 | 1/2009 | Kajander | |
| 7,605,188 B2 | 10/2009 | Loh et al. | |
| 7,632,763 B2 | 12/2009 | Newton et al. | |
| 7,677,009 B2 | 3/2010 | Bowman | |
| 7,749,924 B2 | 7/2010 | Peng et al. | |
| 7,803,723 B2 | 9/2010 | Herbert et al. | |
| 7,833,575 B2 | 11/2010 | Gupta | |
| 7,833,638 B2 | 11/2010 | Zheng et al. | |
| 7,878,301 B2 | 2/2011 | Gross et al. | |
| 8,178,449 B2 | 5/2012 | La Vietes et al. | |
| 9,045,904 B2 * | 6/2015 | Hubbard | B32B 27/32 |
| 10,273,693 B2 * | 4/2019 | Zhou | B32B 5/022 |
| 10,940,677 B2 * | 3/2021 | Hubbard | E04D 5/06 |
| 2002/0003026 A1 | 1/2002 | Hubbard et al. | |
| 2003/0181597 A1 | 9/2003 | Glogovsky et al. | |
| 2004/0020585 A1 | 2/2004 | Tubbard et al. | |
| 2004/0121152 A1 | 6/2004 | Toas | |
| 2005/0072114 A1 | 4/2005 | Shiao et al. | |
| 2005/0139126 A1 | 6/2005 | Khan et al. | |
| 2005/0145139 A1 | 7/2005 | Khan et al. | |
| 2005/0183831 A1 | 8/2005 | Schwetz et al. | |
| 2005/0257875 A1 | 11/2005 | Khan et al. | |
| 2006/0027556 A1 | 2/2006 | Peterson et al. | |
| 2006/0144012 A1 | 7/2006 | Manning et al. | |
| 2006/0160978 A1 | 7/2006 | Gupta et al. | |
| 2006/0217451 A1 | 9/2006 | Bonapersona | |
| 2006/0240224 A1 | 10/2006 | Khan et al. | |
| 2006/0273290 A1 | 12/2006 | Khan et al. | |
| 2006/0275561 A1 | 12/2006 | Agrawal | |
| 2007/0186505 A1 | 8/2007 | Hubbard et al. | |
| 2007/0193167 A1 | 8/2007 | Bruce et al. | |
| 2007/0194482 A1 | 8/2007 | Douglas et al. | |
| 2007/0208139 A1 | 9/2007 | Raulie et al. | |
| 2007/0275621 A1 | 11/2007 | Bennett et al. | |
| 2007/0277450 A1 | 12/2007 | Raulie | |
| 2008/0016030 A1 | 1/2008 | Bhattacharjee et al. | |
| 2008/0102243 A1 | 5/2008 | Gupta | |
| 2008/0160301 A1 | 7/2008 | Nandi et al. | |
| 2008/0184651 A1 | 8/2008 | Bowman | |
| 2008/0188590 A1 | 8/2008 | Gupta | |
| 2008/0241472 A1 | 10/2008 | Shiao et al. | |
| 2009/0016309 A1 | 1/2009 | Lee et al. | |
| 2009/0137168 A1 | 5/2009 | Peng | |
| 2009/0163097 A1 | 6/2009 | Kajander | |
| 2009/0181216 A1 | 7/2009 | Peng | |
| 2009/0309077 A1 | 12/2009 | Gupta et al. | |
| 2009/0326117 A1 | 12/2009 | Benussi et al. | |
| 2010/0130080 A1 | 5/2010 | Connix et al. | |
| 2010/0167013 A1 | 7/2010 | Cruz et al. | |
| 2010/0326598 A1 | 12/2010 | Atwater | |
| 2011/0073239 A1 | 3/2011 | Manning et al. | |
| 2011/0135882 A1 | 6/2011 | Stanley | |
| 2011/0155321 A1 | 6/2011 | Yang et al. | |
| 2011/0173924 A1 | 7/2011 | Ambrose et al. | |
| 2011/0185656 A1 | 8/2011 | Klein | |
| 2011/0313084 A1 | 12/2011 | Furar et al. | |
| 2012/0009407 A1 | 1/2012 | Peller et al. | |
| 2012/0022176 A1 | 1/2012 | Stahl et al. | |
| 2012/0045623 A1 | 2/2012 | Delaney et al. | |
| 2012/0100289 A1 | 4/2012 | Egan et al. | |
| 2012/0174508 A1 | 7/2012 | Brooks et al. | |
| 2012/0189838 A1 | 7/2012 | Pellacani et al. | |
| 2012/0244340 A1 | 9/2012 | Peng et al. | |
| 2012/0266553 A1 | 10/2012 | Shiao et al. | |
| 2013/0036714 A1 | 2/2013 | Bolton et al. | |
| 2014/0013693 A1 | 1/2014 | Zhou et al. | |
| 2014/0127443 A1 | 5/2014 | Zhou et al. | |
| 2014/0141672 A1 | 5/2014 | Hubbard et al. | |
| 2014/0205789 A1 | 7/2014 | Zhou et al. | |
| 2014/0215937 A1 | 8/2014 | Zhou et al. | |
| 2015/0038629 A1 | 2/2015 | Ultsch | |
| 2015/0306850 A1 | 10/2015 | Hubbard et al. | |

FOREIGN PATENT DOCUMENTS

| | | |
|---|---|---|
| DE | 19718876 A1 | 11/1998 |
| EP | 0752458 A1 | 1/1997 |
| EP | 1541338 A1 | 6/2005 |
| EP | 2191961 A2 | 6/2010 |
| EP | 2532515 A1 | 12/2012 |
| GB | 968181 A | 8/1964 |
| JP | H11172860 A | 6/1999 |
| JP | 2012180679 A | 9/2012 |
| WO | 2011029151 A1 | 3/2011 |
| WO | 2012009742 A1 | 1/2012 |
| WO | 2012015538 A1 | 2/2012 |
| WO | 2013102208 A1 | 7/2013 |
| WO | 2015013176 A1 | 1/2015 |

OTHER PUBLICATIONS

International Search Report for Appl. No. PCT/US2014/012683 dated Jul. 4, 2014.
First Examination Report for related Indian Patent Application No. 5516/DELNP/2015 dated Oct. 14, 2019.

* cited by examiner

FIRE-RESISTANT ROOF SYSTEM AND MEMBRANE COMPOSITE

This application is a continuation application of U.S. Non-Provisional application Ser. No. 16/665,765 filed on Oct. 28, 2019 and now issued as U.S. Pat. No. 11,168,479, which is a continuation application of abandoned U.S. Non-Provisional application Ser. No. 15/354,009 filed on Nov. 17, 2016, which is a continuation application of U.S. Non-Provisional application Ser. No. 14/162,273 filed on Jan. 23, 2014 and has issued as U.S. Pat. No. 9,523,203, which claims the benefit of U.S. Provisional Application No. 61/856,258 filed on Jul. 19, 2013, and which also claims the benefit of U.S. Non-Provisional application Ser. No. 13/798,413 filed on Mar. 13, 2013, and claims the benefit of U.S. Provisional Application No. 61/755,666 filed on Jan. 23, 2013, which are incorporated herein by reference.

FIELD OF THE INVENTION

Embodiments of the present invention are directed toward a fire-resistant roofing system including a deck and a thermoplastic membrane composite.

BACKGROUND OF THE INVENTION

As is known in the art, roofs can be rated according to UL 790 or ASTM E 108 standards for fire resistance. A Class A roof has the highest resistance to fire. An unrated roof has the lowest resistance to fire, and class B and class C rated roofs are rated therebetween, respectively. These ratings are generally based upon flame penetration into the attic space through the roof covering, flame spread over the surface of the roof covering, and the propensity for the roof covering to become dislodged and generate embers.

Certain non-combustible roof decks can achieve a Class A rating by virtue of their construction. For example, a concrete deck typically achieves a Class A rating. Other roofs, such as those carrying an aluminum covering, may require complementary materials to achieve a Class A rating. For example, an asphaltic underlayment may be placed under an aluminum roof covering to achieve a Class A rating.

Where the roof deck is a combustible deck, such as a wood deck, it can be extremely difficult to achieve a Class A rating. In many situations, robust and expensive underlayment is required to achieve a Class A rating over a combustible deck. For example, fiberglass-backed gypsum board (e.g., DensDeck™) can be applied over a combustible deck to achieve a Class A rating. Alternatively, or in addition thereto, a heavy underlayment (e.g., 72 pound felt or cap sheet) may be required to achieve a Class A rating over a wood roof deck.

The difficulty in achieving a Class A rating can be further complicated by the type of roof covering employed over the combustible deck. Where a roof covering is metal (e.g., aluminum), the complementary construction material, such as an underlayment, may not need to be as robust to achieve a Class A rating. On the other hand, where the roof covering is a polymeric membrane (e.g., a thermoplastic sheet), the ability to achieve a Class A rating over a combustible deck is not trivial.

SUMMARY OF THE INVENTION

Aspects of the invention provide a roof assembly comprising: a roof deck; a thermoplastic membrane covering the deck; and a fabric having disposed thereon expandable graphite.

Other aspects provide a membrane composite comprising: a thermoplastic membrane; and a fabric carrying expandable graphite.

DETAILED DESCRIPTION OF ILLUSTRATIVE EMBODIMENTS

Figure 1:
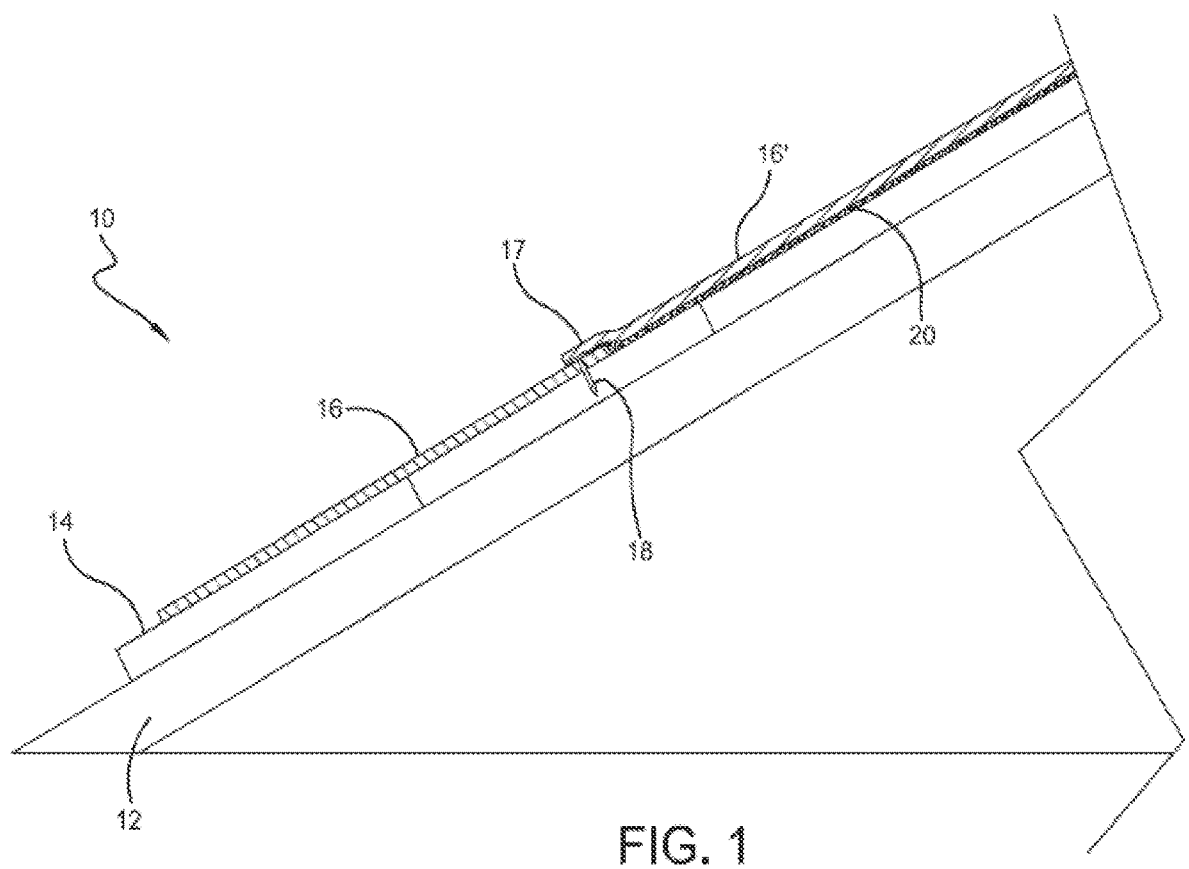
FIG. 1 is a cross-sectional view of a roof system according to embodiments of the invention.

Embodiments of the present invention are based, at least in part, on the discovery of a fire-rated roof system (e.g., Class A roof system (UL 790 or ASTM E 108) using a thermoplastic membrane over a wood deck at a slope of 1/12) that includes a polymeric membrane composite. The composite includes a polymeric membrane in combination with a fabric that carries expandable graphite. In one or more embodiments, the composite includes a thermoplastic membrane and a fabric reinforcement that carries expandable graphite. In other embodiments, the composite includes a thermoplastic membrane and a fabric backing that carries expandable graphite. While the prior art could achieve a similar Class A rating using relatively robust and expensive complementary materials (e.g. fiberglass-backed gypsum), the present invention advantageously achieves a Class A rating by merely employing the composite of the invention without any other fire-barrier material (e.g. without a fire resistant slipsheet or fiberglass-backed board). Moreover, these advantages are provided in conjunction with weathering protection (i.e. waterproof membrane) in one single composite article. Among other benefits, the use of the composite of the present invention simplifies installation and saves in labor costs associated with installation. ROOF SYSTEM In one or more embodiments, the Class A roof system of the present invention may be described with reference to FIG. 1. System 10 includes a combustible deck 12, an optional insulating layer 14, and one or more thermoplastic membrane composites 16 and 16', which may also be referred to as sheets 16 and 16' or panels 16 and 16'. Each of the respective panels may be referred to as membrane assemblies, especially when describing the subcomponents thereof. As indicated above, and as will be described in greater detail below, membrane assemblies 16 and 16' include a fabric that carries expandable graphite. Membrane assemblies 16 and 16' may be secured to deck 12 and/or insulating layer 14 by using known techniques. In one or more embodiments, membrane assemblies 16 and 16' are mechanically attached to deck 12 through a plurality of mechanical fasteners. For example, fastener 18 may be installed in lap region 17 of membrane assemblies 16 and 16' as shown in FIG. 1.

In other embodiments, membrane assembly 16 may be secured to deck 12 and/or insulation layer 14 by use of an adhesive that may, in certain embodiments, secure substantially all of the membrane to deck 12 and/or insulating layer 14, and thereby provide a system that may be referred to as a fully-adhered roofing system. The use of an adhesive to secure the membrane panels to the roof deck and/or insulation layer may be an exclusive mode of attachment to the roof deck and/or insulation layer, or an adhesive may be used in combination with other modes of attachment. In one or more embodiments, the use of an adhesive forms an adhesive layer 20. As will be described in further detail below, adhesive layer 20 may be interspersed within and/or adhered to a fabric backing, which is not shown in FIG. 1. In yet other embodiments, membrane 16 may be secured to deck 12 and/or insulation layer 14 by use of ballasting as is known in the art.

As the skilled person understands, panels 16 and 16' are not only secured to deck 12 and/or insulation layer 14, but the individual panels may be seamed together to create a water-impervious membrane across the roof deck. As shown in FIG. 1, individual panels 16 and 16' are seamed together in lap region 17, where first panel 16' overlaps second panel 16. As previously explained, fasteners (e.g. fastener 18) may be disposed in lap region 17, thereby allowing second panel 16 to cover fastener 18, as well as any penetrations caused by fastener 18. The skilled person will appreciate that lap region 17 may be seamed using a variety of techniques. In one or more embodiments, the seam may be formed by heat welding the respective panels to each other within lap region 17. This may be accomplished by taking advantage of the thermoplastic nature of the panels. Techniques for heat welding thermoplastic membranes are known in the art as described in U.S. Publication Nos 2007/0186505, 2004/0020585, 2002/0003026, 2011/0155321, 2007/0208139, and 2005/0183831, which are incorporated herein by reference. In other embodiments, a seam tape or liquid adhesive may be employed to form a seam within lap region 17.

Membrane Assembly

Figure 2:
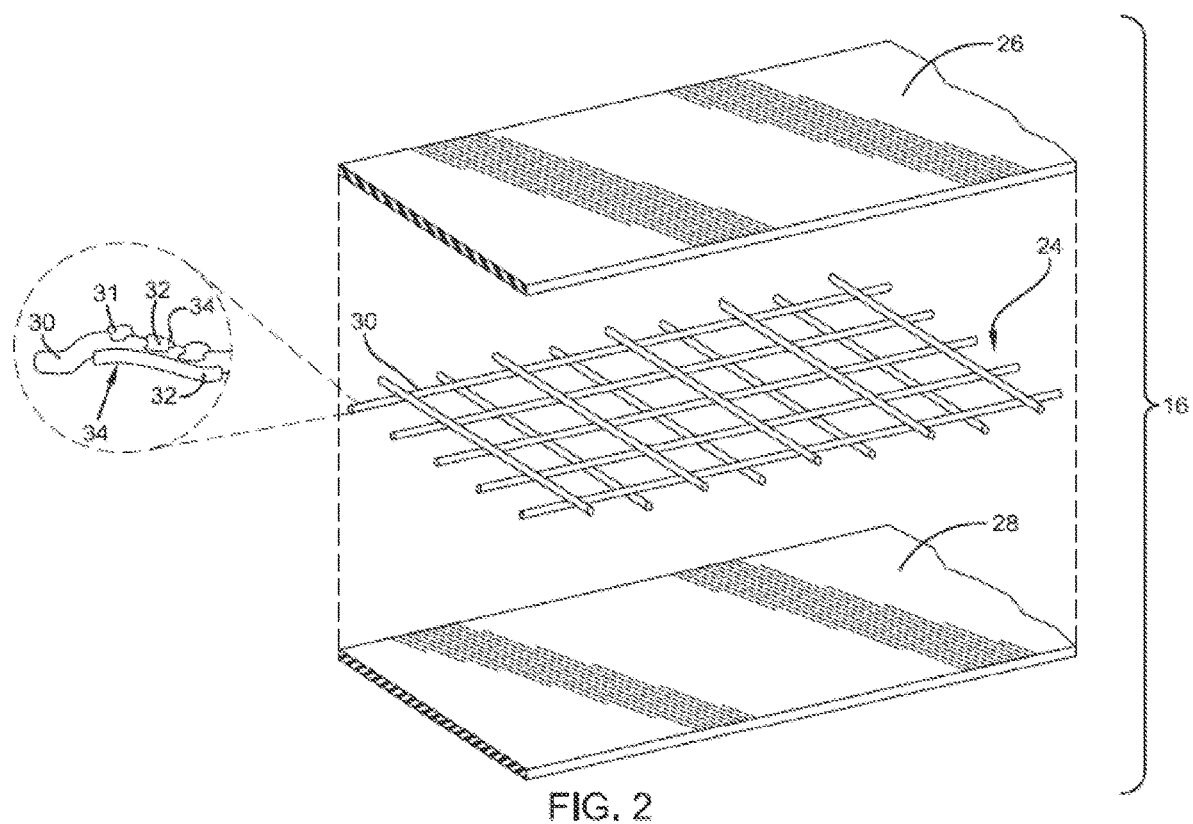
FIG. 2 is a perspective, exploded view of a thermoplastic membrane having a fabric reinforcement according to embodiments of the present invention.

In one or more embodiments, thermoplastic membrane assembly 16 includes reinforcing fabric 24 as shown in FIG. 2. More specifically, membrane 16 is a laminate including first layer 26, second layer 28, and reinforcing fabric 24 laminated between first layer 26 and second layer 28.

Thermoplastic Layers

Embodiments of the present invention are not necessarily limited by the composition of the individual thermoplastic layers of the thermoplastic membrane (e.g. layers 26 and 28). In one or more embodiments, the thermoplastic layers may include thermoplastic polyolefins, polyvinyl chloride, ethylene vinylacetate polymers, ethylene alkylacrylate polymers, and the like, and mixtures thereof.

In one or more embodiments, the thermoplastic polyolefin polymers may include an olefinic reactor copolymer, which may also be referred to as in-reactor copolymer. Reactor copolymers are generally known in the art and may include blends of olefinic polymers that result from the polymerization of ethylene and α-olefins (e.g. propylene) with sundry catalyst systems. In one or more embodiments, these blends are made by in-reactor sequential polymerization. Reactor copolymers useful in one or more embodiments include those disclosed in U.S. Pat. No. 6,451,897, which is incorporated therein by reference. Reactor copolymers, which are also referred to as TPO resins, are commercially available under the tradename HIFAX™ (Lyondellbassel); these materials are believed to include in-reactor blends of ethylene-propylene rubber and polypropylene or polypropylene copolymers. In one or more embodiments, the in-reactor copolymers may be physically blended with other polyolefins. For example, in reactor copolymers may be blended with linear low density polyethene.

In other embodiments, the thermoplastic polyolefin polymers may include one or more polyolefins such as, but not limited to, propylene-based thermoplastic polymers, plastomers, and/or ethylene-based thermoplastic polymers. In one or more embodiments, the thermoplastic polymer may include a blend of olefinic polymers. Useful blends include those described in International Application No. PCT/US06/033522 which is incorporated herein by reference. For example, a particular blend may include (i) a plastomer, (ii) a low density polyethylene, and (iii) a propylene-based polymer.

In one or more embodiments, propylene-based polymers may include polypropylene homopolymer or copolymers of propylene and a comonomer, where the copolymer includes, on a mole basis, a majority of mer units deriving from propylene. In one or more embodiments, the propylene-based copolymers may include from about 2 to about 6 mole percent, and in other embodiments from about 3 to about 5 mole percent mer units deriving from the comonomer with the remainder including mer units deriving from propylene. In one or more embodiments, the comonomer includes at least one of ethylene and an α-olefin. The α-olefins may include butene-1, pentene-1, hexene-1, octene-1, or 4-methyl-pentene-1. In one or more embodiments, the copolymers of propylene and a comonomer may include random copolymers. Random copolymers may include those propylene-based copolymers where the comonomer is randomly distributed across the polymer backbone.

The propylene-based polymers employed in one or more embodiments of this invention may be characterized by a melt flow rate of from about 0.5 to about 15 dg/min, in other embodiments from about 0.7 to about 12 dg/min, in other embodiments from about 1 to about 10 dg/min, and in other embodiments from about 1.5 to about 3 dg/min per ASTM D-1238 at 230° C. and 2.16 kg load. In these or other embodiments, the propylene-based polymers may have a weight average molecular weight ($M_w$) of from about $1 \times 10^5$ to about $5 \times 10^5$ g/mole, in other embodiments from about $2 \times 10^5$ to about $4 \times 10^5$ g/mole, and in other embodiments from about $3 \times 10^5$ to about $4 \times 10^5$ g/mole, as measured by GPC with polystyrene standards. The molecular weight distribution of these propylene-based copolymer may be from about 2.5 to about 4, in other embodiments from about 2.7 to about 3.5, and in other embodiments from about 2.8 to about 3.2.

In one or more embodiments, propylene-based polymers may be characterized by a melt temperature ($T_m$) that is from about 165° C. to about 130° C., in other embodiments from about 160 to about 140° C., and in other embodiments from about 155° C. to about 140° C. In one or more embodiments, particularly where the propylene-based polymer is a copolymer of propylene and a comonomer, the melt temperature may be below 160° C., in other embodiments below 155° C., in other embodiments below 150° C., and in other embodiments below 145° C. In one or more embodiments, they may have a crystallization temperature ($T_c$) of about at least 90° C., in other embodiments at least about 95° C., and in other embodiments at least 100° C., with one embodiment ranging from 105° to 115° C.

Also, these propylene-based polymers may be characterized by having a heat of fusion of at least 25 J/g, in other embodiments in excess of 50 J/g, in other embodiments in excess of 100 J/g, and in other embodiments in excess of 140 J/g.

In one or more embodiments, the propylene-based polymers may be characterized by a flexural modulus, which may also be referred to as a 1% secant modulus, in excess of 120,000 psi, in other embodiments in excess of 125,000, in other embodiments in excess of 130,000 psi, in other embodiments in excess of 133,000 psi, in other embodiments in excess of 135,000 psi, and in other embodiments in excess of 137,000 psi, as measured according to ASTM D-790.

Useful propylene-based polymers include those that are commercially available. For example, propylene-based polymers can be obtained under the tradename PP7620Z™ (Fina), PP33BF01™ (Equistar), or under the tradename TR3020™ (Sunoco).

In one or more embodiments, plastomers include ethylene-α-olefin copolymers. The plastomer employed in one or more embodiments of this invention includes those described in U.S. Pat. Nos. 6,207,754, 6,506,842, 5,226,392, and 5,747,592, which are incorporated herein by reference. This copolymer may include from about 1.0 to about 15 mole percent, in other embodiments from about 2 to about 12, in other embodiments from about 3 to about 9 mole percent, and in other embodiments from about 3.5 to about 8 mole percent mer units deriving from α-olefins, with the balance including mer units deriving from ethylene. The α-olefin employed in preparing the plastomer of one or more embodiments of this invention may include butene-1, pentene-1, hexene-1, octene-1, or 4-methyl-pentene-1.

In one or more embodiments, plastomers may be characterized by a density of from about 0.865 g/cc to about 0.900 g/cc, in other embodiments from about 0.870 to about 0.890 g/cc, and in other embodiments from about 0.875 to about 0.880 g/cc per ASTM D-792. In these or other embodiments, the density of the plastomers may be less than 0.900 g/cc, in other embodiments less than 0.890 g/cc, in other embodiments less than 0.880 g/cc, and in other embodiments less than 0.875 g/cc.

In one or more embodiments, the plastomer may be characterized by a weight average molecular weight of from about $7 \times 10^4$ to $13 \times 10^4$ g/mole, in other embodiments from about $8 \times 10^4$ to about $12 \times 10^4$ g/mole, and in other embodiments from about $9 \times 10^4$ to about $11 \times 10^4$ g/mole as measured by using GPC with polystyrene standards. In these or other embodiments, the plastomer may be characterized by a weight average molecular weight in excess of $5 \times 10^4$ g/mole, in other embodiments in excess of $6 \times 10^4$ g/mole, in other embodiments in excess of $7 \times 10^4$ g/mole, and in other embodiments in excess of $9 \times 10^4$ g/mole. In these or other embodiments, the plastomer may be characterized by a molecular weight distribution ($M_w/M_n$) that is from about 1.5 to 2.8, in other embodiments 1.7 to 2.4, and in other embodiments 2 to 2.3.

In these or other embodiments, the plastomer may be characterized by a melt index of from about 0.1 to about 8, in other embodiments from about 0.3 to about 7, and in other embodiments from about 0.5 to about 5 per ASTM D-1238 at 190° C. and 2.16 kg load.

The uniformity of the comonomer distribution of the plastomer of one or more embodiments, when expressed as a comonomer distribution breadth index value (CDBI), provides for a CDBI of greater than 60, in other embodiments greater than 80, and in other embodiments greater than 90.

In one or more embodiments, the plastomer may be characterized by a DSC melting point curve that exhibits the occurrence of a single melting point break occurring in the region of 50 to 110° C.

The plastomer of one or more embodiments of this invention may be prepared by using a single-site coordination catalyst including metallocene catalyst, which are conventionally known in the art.

Useful plastomers include those that are commercially available. For example, plastomer can be obtained under the tradename EXXACT™ 8201 (ExxonMobil); or under the tradename ENGAGE™ 8180 (Dow DuPont). In one or more embodiments, the low density polyethylene includes an ethylene-α-olefin copolymer. In one or more embodiments, the low density polyethylene includes linear low density polyethylene. The linear low density polyethylene employed in one or more embodiments of this invention may be similar to that described in U.S. Pat. No. 5,266,392, which is incorporated herein by reference. This copolymer may include from about 2.5 to about 13 mole percent, and in other embodiments from about 3.5 to about 10 mole percent, mer units deriving from α-olefins, with the balance including mer units deriving from ethylene. The α-olefin included in the linear low density polyethylene of one or more embodiments of this invention may include butene-1, pentene-1, hexene-1, octene-1, or 4-methyl-pentene-1. In one or more embodiments, the linear low density polyethylene is devoid or substantially devoid of propylene mer units (i.e., units deriving from propylene). Substantially devoid refers to that amount or less of propylene mer units that would otherwise have an appreciable impact on the copolymer or the compositions of this invention if present.

The linear low density polyethylene of one or more embodiments of this invention can be characterized by a density of from about 0.885 g/cc to about 0.930 g/cc, in other embodiments from about 0.900 g/cc to about 0.920 g/cc, and in other embodiments from about 0.900 g/cc to about 0.910 g/cc per ASTM D-792.

In one or more embodiments, the linear low density polyethylene may be characterized by a weight average molecular weight of from about $1 \times 10^5$ to about $5 \times 10^5$ g/mole, in other embodiments $2 \times 10^5$ to about $10 \times 10^5$ g/mole, in other embodiments from about $5 \times 10^5$ to about $8 \times 10^5$ g/mole, and in other embodiments from about $6 \times 10^5$ to about $7 \times 10^5$ g/mole as measured by GPC with polystyrene standards. In these or other embodiments, the linear low density polyethylene may be characterized by a molecular weight distribution ($M_w/M_n$) of from about 2.5 to about 25, in other embodiments from about 3 to about 20, and in other embodiments from about 3.5 to about 10. In these or other embodiments, the linear low density polyethylene may be characterized by a melt flow rate of from about 0.2 to about 10 dg/min, in other embodiments from about 0.4 to about 5 dg/min, and in other embodiments from about 0.6 to about 2 dg/min per ASTM D-1238 at 230° C. and 2.16 kg load.

The linear low density polyethylene of one or more embodiments of this invention may be prepared by using a convention Ziegler Natta coordination catalyst system.

Useful linear low density polyethylene includes those that are commercially available. For example, linear low density polyethylene can be obtained under the tradename Dowlex™ 2267G (Dow); or under the tradename DFDA-1010 NT7 (Dow); or under the tradename GA502023 (Lyondell).

In one or more embodiments, useful thermoplastic vulcanizates include those available under the tradename Uni-Prene (Teknor Apex)® and Santoprene (ExxonMobil)®.

Useful ethylene alkyl-acrylates include those available under the tradename ELVALOY® (DuPont).

In one or more embodiments, block copolymers that may be used include styrene-butadiene block copolymers such as, but not limited to, styrene-butadiene-styrene block copolymers. These block copolymers may be blended with polyolefins such as polypropylene to form thermoplastic compositions that are useful in the practice of this invention.

In one or more embodiments, thermoplastic polyolefins may include propylene-based elastomers such as those available under the tradenames VISTAMAXX (ExxonMobil) and VERSIFY (Dow Chemical).

In one or more embodiments, the thermoplastic polymer or polymers forming the thermoplastic matrix in which the expandable graphite is dispersed has a melt temperature below 200° C., in other embodiments below 180° C., in other embodiments below 160° C., and in other embodiments below 150° C.

In one or more embodiments, layers 26 and 28 may be characterized by a thickness of from about 15 to about 70, in other embodiments from about 20 to about 60 mils, and in other embodiments from about 30 to about 50.

In one or more embodiments, layers 26 and/or 28 may be homogenous; i.e., they may be monoextruded sheets or layers of thermoplastic material. In other embodiments, layers 26 and 28 may include two or more co-extruded layers. These individual co-extruded layers of any given layer of the laminate (e.g., layer 26 and/or 28) may be distinct from other coextruded layers within any respective laminate layer. Multi-layered, co-extruded thermoplastic roofing membranes are known in the art as described in U.S. Pat. Nos. 7,749,924, 7,632,763, 5,314,556, and U.S. Publication Nos 2012/0244340, 2009/0181216, 2009/0137168, 2007/0194482, and 2007/0193167, which are incorporated herein by reference.

Reinforcing Fabric/Scrim

As discussed above, membranes 16 and 16' may include reinforcing fabric 24. In one or more embodiments, reinforcing fabric 24 includes a fabric substrate having disposed on a surface thereof particles of expandable graphite. For example, as shown in FIG. 2, fabric 24 includes fabric substrate 30 and expandable graphite 32 disposed on a surface of substrate 30. In one or more embodiments, expandable graphite 32 may be dispersed within a polymeric matrix 34, which may also be referred to as binder 34, that is disposed on fabric substrate 30. In this regard, reference may be made to an expandable graphite coating 31 disposed on fabric substrate 30. As shown in FIG. 2, coating 31 may form a layer or partial layer on the fibers or filaments of substrate 30. In other embodiments, coating 31 forms a layer or partial layer over the entire surface of substrate 30.

In one or more embodiments, fabric substrate 24 may include a woven, knitted, or non-woven fabric. In particular embodiments, fabric substrate 24 may be of the type of fabric generally known in the art for preparing roofing membranes. Useful fabric substrates include warp-knit, weft-inserted fabrics, such as those that as are known in the art and, for example, described in U.S. Pat. Nos. 4,491,617, 4,539,254, 4,615,934, and 4,780,350, which are incorporated herein by reference.

Expandable Graphite

In one or more embodiments, expandable graphite, which may also be referred to as expandable flake graphite, intumescent flake graphite, or expandable flake, includes intercalated graphite in which an intercallant material is included between the graphite layers of graphite crystal or particle. Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation.

Commercially available examples of expandable graphite include HPMS Expandable Graphite (HP Materials Solutions, Inc., Woodland Hills, CA) and Expandable Graphite Grades 1721 (Asbury Carbons, Asbury, NJ). Other commercial grades contemplated as useful in the present invention include 1722, 3393, 3577, 3626, and 1722HT (Asbury Carbons, Asbury, NJ).

In one or more embodiments, the expandable graphite may be characterized as having a mean or average size in the range from about 30 µm to about 1.5 mm, in other embodiments from about 50 µm to about 1.0 mm, and in other embodiments from about 180 to about 850 µm. In certain embodiments, the expandable graphite may be characterized as having a mean or average size of at least 30 µm, in other embodiments at least 44 µm, in other embodiments at least 180 µm, and in other embodiments at least 300 µm. In one or more embodiments, expandable graphite may be characterized as having a mean or average size of at most 1.5 mm, in other embodiments at most 1.0 mm, in other embodiments at most 850 µm, in other embodiments at most 600 µm, in yet other embodiments at most 500 µm, and in still other embodiments at most 400 µm. Useful expandable graphite includes Graphite Grade #1721 (Asbury Carbons), which has a nominal size of greater than 300 µm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized as having a carbon content in the range from about 75% to about 99%. In certain embodiments, the expandable graphite may be characterized as having a carbon content of at least 80%, in other embodiments at least 85%, in other embodiments at least 90%, in yet other embodiments at least 95%, in other embodiments at least 98%, and in still other embodiments at least 99% carbon.

In one or more embodiments, the expandable graphite may be characterized as having a sulfur content in the range from about 0% to about 8%, in other embodiments from about 2.6% to about 5.0%, and in other embodiments from about 3.0% to about 3.5%. In certain embodiments, the expandable graphite may be characterized as having a sulfur content of at least 0%, in other embodiments at least 2.6%, in other embodiments at least 2.9%, in other embodiments at least 3.2%, and in other embodiments 3.5%. In certain embodiments, the expandable graphite may be characterized as having a sulfur content of at most 8%, in other embodiments at most 5%, in other embodiments at most 3.5%.

In one or more embodiments, the expandable graphite may be characterized as having an expansion ratio (cc/g) in the range from about 10:1 to about 500:1, in other embodiments at least 20:1 to about 450:1, in other embodiments at least 30:1 to about 400:1, in other embodiments from about 50:1 to about 350:1. In certain embodiments, the expandable graphite may be characterized as having an expansion ratio (cc/g) of at least 10:1, in other embodiments at least 20:1, in other embodiments at least 30:1, in other embodiments at least 40:1, in other embodiments at least 50:1, in other embodiments at least 60:1, in other embodiments at least 90:1, in other embodiments at least 160:1, in other embodiments at least 210:1, in other embodiments at least 220:1, in other embodiments at least 230:1, in other embodiments at least 270:1, in other embodiments at least 290:1, and in yet other embodiments at least 300:1. In certain embodiments, the expandable graphite may be characterized as having an expansion ratio (cc/g) of at most 350:1, and in yet other embodiments at most 300:1.

In one or more embodiments, the expandable graphite, as it exists with the thermoplastic component of the thermoplastic membrane of the present invention, may be partially expanded. In one or more embodiments, the expandable graphite is not expanded, however, to a deleterious degree, which includes that amount or more of expansion that will deleteriously impact the ability to form the sheet product and/or the ability of the graphite to serve as flame retardant at desirable levels, which include those levels that allow proper formation of the sheet. In one or more embodiments, the expandable graphite is expanded to at most 60%, in other embodiments at most 50%, in other embodiments at most 40%, in other embodiments at most 30%, in other embodiments at most 20%, and in other embodiments at most 10% beyond its original unexpanded size.

In one or more embodiments, the expandable graphite may be characterized as having a pH in the range from about 1 to about 12; in other embodiments from about 1 to about 6; and in yet other embodiments from about 5 to about 10. In certain embodiments, the expandable graphite may be characterized as having a pH in the range from about 4 to about 7. In one or more embodiments, the expandable graphite may be characterized as having a pH of at least 1, in other embodiments at least 4, and in other embodiments at least 5. In certain embodiments, the expandable graphite may be characterized as having a pH of at most 10, in other embodiments at most 7, and in other embodiments at most 6.

In one or more embodiments, the expandable graphite may be characterized by an onset temperature ranging from about 100° C. to about 250° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., and in other embodiments at least 180° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature; and may also be referred to as the temperature at which expansion of the graphite starts.

Complementary Flame Retardants

In one or more embodiments, the expandable graphite may be disposed on the fabric substrate in conjunction with a complementary flame retardant. These complementary flame retardants may include any compound that increases the burn resistivity, particularly flame spread such as tested by UL 94 and/or UL 790, in the polymeric compositions of the present invention. Generally, useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), melamine polyphosphate is available under the tradename Budit™ 3141 (Budenheim), and antimony oxide ($Sb_2O_3$) is commercially available under the tradename Fireshield™.

Examples of other complementary calcium borate, magnesium hydroxide, basic magnesium carbonate, aluminum trihydrate, zinc borate, gypsum, and mixtures thereof. In these or other embodiments, the complementary flame retardant includes colemanite, which is a borate mineral that is believed to include about 50-80% calcium borate.

Coating

As noted above, fabric reinforcement 24 may carry (i.e. have disposed thereon) coating 31 that includes binder 34 with expandable graphite 32 dispersed therein. The binder, which may also be referred to as a polymer latex or polymer latex binder, may include, but is not limited to, styrene-butadiene-rubber (SBR), styrene-butadiene-styrene (SBS), ethylene-vinyl-chloride (EVCl), poly-vinylidene-chloride (PVdC), modified poly-vinyl-chloride (PVC), poly-vinyl-alcohol (PVOH), ethylene-vinyl-actate (EVA), and poly-vinyl-acetate (PVA). In one or more embodiments, the binder may include an asphalt. In other embodiments, the binder is devoid of asphalt. In still other embodiments, the binder may include acrylic or epoxy binders or resins, which are known in the art. Generally, acrylic binders or resins include latex polymers that derive from the polymerization of acrylates, acrylic acids, methacrylates, methacrylic acids, acrylonitrile, and/or acrylamide monomer. In other embodiments, the binder may include a polyurethane.

Examples of inorganic binders that may be used with the latex binders include, but are not limited to, calcium oxide, calcium silicate, calcium sulfate, magnesium oxychloride, magnesium oxysulfate, and other complexes of some Group IIA elements (alkaline earth metals), as well as aluminum hydroxide.

In one or more embodiments, a complex inorganic binder such as portland cement, which is a mixture of various calcium-aluminum silicates, may be used. In other embodiments, the oxychloride or oxysulfate of aluminum hydroxide and/or calcium silicate may also be used. In yet other embodiments, quicklime, which does not hydrate in a coating mix, but cures by slowly converting to limestone by adding carbon dioxide from the air, may be used, acrylonitrile, and/or acrylamide monomer. In other embodiments, the binder may include a polyurethane.

In one or embodiments, the coating composition may be characterized by the weight ratio of polymer to solids within the composition (i.e. in the cured coating). In one or more embodiments, the weight ratio of polymer to solids is at least 0.1:1, in other embodiments at least 0.3:1, in other embodiments at least 0.5:1, in other embodiments at least 0.7:1, and in other embodiments at least 0.7:1. In these or other embodiments, the weight ratio of polymer to solids is from about 0.1:1 to about 3:1, in other embodiments from about 0.3:1 to about 2:1, and in other embodiments from about 0.4:1 to about 0.8:1. It is contemplated that at higher polymer loadings, the coating composition will impart less stiffness to the fabric, and thereby advantageously allow the fabric to maintain useful flexibility. This is important, especially where the fabric is used as a backing, because the composite materials of the invention are desirably rolled for storage and shipment, unrolled during installation, and manipulated in corners and the like during installation. Thus, maintaining flexibility and/or not inhibiting the flexibility of the membrane and overall composite is technologically important.

In one or embodiments, the coating composition may be characterized by the weight of expandable graphite within the composition (i.e. in the cured coating). In one or more embodiments, the weight of expandable graphite within the coating is at least 2 wt. %, in other embodiments at least 5 wt. %, in other embodiments at least 8 wt. %, in other embodiments at least 10 wt. %, and in other embodiments at least 15 wt. %. In these or other embodiments, the weight ratio of polymer to solids is from about 2 to about 50, in other embodiments from about 5 to about 35, and in other embodiments from about 10 to about 25 wt. %.

Fabric Backing

Figure 3:
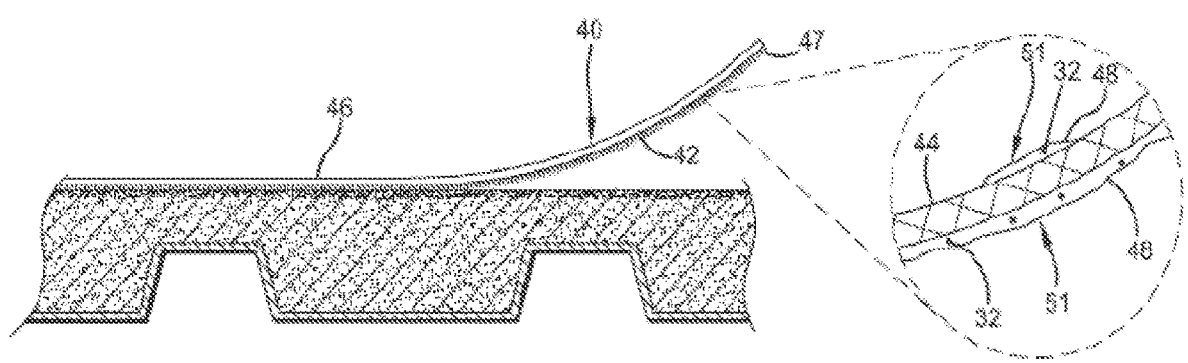
FIG. 3 is a cross-sectional view of a thermoplastic membrane having a fabric backing according to embodiments of the invention.

As indicated above, an alternative embodiment of the invention includes a membrane assembly, which may also be referred to as a composite, as shown in FIG. 3 where composite 40 includes fabric backing 42 adhered or otherwise secured to a planar surface 47 of membrane 46. Membrane 46 may include the features of the membranes described above with respect to membrane 16 (e.g. they may include fabric reinforcement 24 laminated between thermoplastic layer 26 and 28), or thermoplastic membrane 46 may have distinct features. Where membrane assembly 40 includes fabric reinforcement 24, fabric reinforcement 24 may carry a coating layer that includes expandable graphite, as described above, or it may be devoid or substantially devoid of a coating that includes expandable graphite. In one or more embodiments, membrane 46 is an unreinforced membrane; i.e. membrane 46 is devoid of reinforcement 24. In one or more embodiments, membrane 46 may include a laminated structure that may include one or more extruded layers laminated to one another. In other embodiments, membrane 46 is a single extrudate. Whether or not membrane 46 includes one or more extrudates, each extrudate may, as described above, include two or more coextruded layers of similar or dissimilar thermoplastic compositions.

In one or more embodiments, fabric backing 42 includes a fabric substrate with expandable graphite disposed on a surface thereof. For example, as shown in FIG. 3, fabric 42 includes fabric substrate 44 and expandable graphite 32 disposed on a surface of substrate 44. In one or more embodiments, expandable graphite 32 may be dispersed within a polymeric matrix 48, which may also be referred to as binder 48, disposed on fabric substrate 44 in the form of a coating 51. As shown in FIG. 3, coating 31 may form a layer or partial layer on the fibers or filaments of substrate 44. In other embodiments, coating 51 forms a layer or partial layer over the entire surface of substrate 44. Reference can be made to the expandable graphite and binders described above for practice of these embodiments.

In one or more embodiments, fabric substrate 44 is a synthetic fabric including glass or polymeric fibers or filaments. In particular embodiments, fabric backing 42 is a fleece, such as a napped fleece. Fleece backings of the type that are useful as fabric backings for roofing membranes are generally known in the art as described in U.S. Pat. Nos. 4,996,812, 5,422,179, 5,981,030, and 6,502,360 which are incorporated herein by reference. In particular embodiments, fabric substrate 44 is fleece prepared from polyester filaments such as those prepared from polyethylene terephthalate. In one or more embodiments, the fabric backing is a continuous filament polyester, needle punched, nonwoven fabric. In other embodiments, the fabric backing is a scrim reinforced nonwoven polyester mat. In yet other embodiments, the fabric backing is a glass fiber mat.

In one or more embodiments, where the fabric backing is a glass fiber mat, the fabric may be characterized by a basis weight of at least 50, in other embodiments at least 60, and in other embodiments at least 70 g/m$^2$. In these or other embodiments, the glass fiber mat may be characterized by a basis weight of at most 150, in other embodiments at most 130, and in other embodiments at most 100 g/m$^2$. In one or more embodiments, the glass fiber mat may be characterized by a basis weight of from about 50 to about 150 g/m$^2$, in other embodiments from about 60 to about 130 g/m$^2$, and in other embodiments from about 70 to about 110 g/m$^2$.

In one or more embodiments, where the fabric backing is a glass fiber mat, the glass mat may be characterized by a thickness of at least 0.5 mm, in other embodiments at least 0.7 mm, and in other embodiments at least 1.0 mm. In these or other embodiments, the glass mat may be characterized by a thickness of at most 2.0 mm, in other embodiments at most 1.5 mm, and in other embodiments at most 1.2 mm. In one or more embodiments, the glass mat may be characterized by a thickness of from about 0.5 to about 2.0 mm, in other embodiments from about 0.7 to about 1.5 mm, and in other embodiments from about 1.0 to about 1.2 mm.

In one or more embodiments, where the fabric backing is a polyester fleece, the fabric may be characterized by a basis weight of at least 70, in other embodiments at least 85, and in other embodiments at least 100 g/m$^2$. In these or other embodiments, the polyester fleece may be characterized by a basis weight of at most 400, in other embodiments at most 300, and in other embodiments at most 280 g/m$^2$. In one or more embodiments, the polyester fleece may be characterized by a basis weight of from about 70 to about 400 g/m$^2$, in other embodiments from about 85 to about 300 g/m$^2$, and in other embodiments from about 100 to about 280 g/m$^2$.

In one or more embodiments, where the fabric backing is a polyester fleece, the glass mat may be characterized by a thickness of at least 0.5 mm, in other embodiments at least 0.7 mm, and in other embodiments at least 1.0 mm. In these or other embodiments, the polyester fleece may be characterized by a thickness of at most 4.0 mm, in other embodiments at most 2.0 mm, and in other embodiments at most 1.5 mm. In one or more embodiments, the polyester fleece may be characterized by a thickness of from about 0.5 to about 4.0 mm, in other embodiments from about 0.7 to about 2.0 mm, and in other embodiments from about 1.0 to about 1.5 mm.

Practice of one or more embodiments of the invention is not limited by the manner in which fabric backing 42 is attached to membrane 46. In one or more embodiments, fabric backing 42 is secured to membrane 46 by heat lamination; in other words, the membrane and fabric backing are mated while the membrane has a degree of tack resulting from heating the membrane (e.g. thermoplastic). In other embodiments, fabric backing 42 is secured to membrane 46 by way of an adhesive; for example a solvent-based or hot melt hydrocarbon polymer such as SBS or SBR may be used. In yet other embodiments, fabric backing 42 is secured to membrane 46 through the use of a tie layer, which may include a thin film of adhesive material or hot melt material. In one or more embodiments, the mode of attachment is sufficient to create a bond between fabric backing 42 and membrane 46 such that during handling, installation and use the fabric backing maintains adherence to the membrane under conventional conditions.

In one or more embodiments, the coating composition (i.e. the expandable graphite and the binder) is applied (i.e. disposed on) to one surface of the backing opposite the surface that the backing is secured to the membrane. This can be achieved through an application method whereby the coating composition is applied to only one planar surface of the fabric. As a result, the amount of coating material that exists on a first side of the fabric is substantially greater than the amount of coating that exists on the opposite second side of the fabric. It is contemplated that this configuration will allow for maximum adhesion of the fabric to the surface of the membrane to which it is attached.

Figure 4:
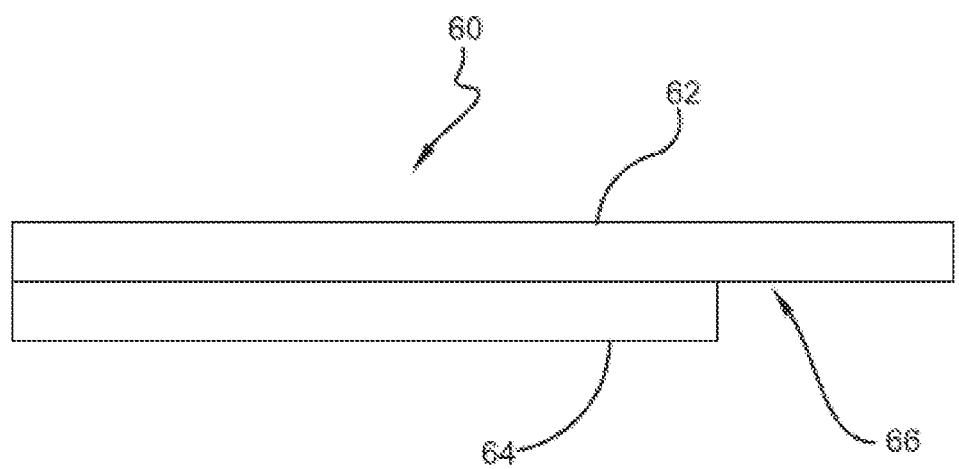
FIG. 4 is a cross-sectional view of a thermoplastic membrane including a lap edge according to embodiments of the invention.

In one or more embodiments, where the composite includes a fabric backing, the fabric backing is attached to only a portion of the membrane surface. In particular embodiments, a lap edge is maintained in the membrane for seaming adjacent membranes together. This seaming can take place through heat seaming or adhesive seaming. An example of a composite membrane including a lap seam is shown in FIG. 4, where composite 60 includes membrane 62, and fabric backing 64, which is consistent with embodiments of the invention and carries expandable graphite. Composite 60 includes lap edge 66, which extends laterally along the length of the membrane down an edge thereof. Lap edge 66 allows for membrane 62 to be exposed and thereby allows for seaming of adjacent membranes. In general, lap edge 66 could be 2-12" inches in width, although the width can vary depending on preference.

In one or more embodiments, the fabric backing may be characterized by the concentration of expandable graphite contained therein, which as descried herein, derives from a coating composition including the expandable graphite. In one or more embodiments, the fabric backing may be characterized by an expandable graphite concentration of at least 10 $g/m^2$, in other embodiments at least 20 $g/m^2$, in other embodiments at least 30 $g/m^2$, in other embodiments at least 40 $g/m^2$, in other embodiments at least 50 $g/m^2$, in other embodiments at least 60 $g/m^2$, and in other embodiments at least 70 $g/m^2$. In these or other embodiments, the backing fabric may be characterized by an expandable graphite concentration of at most 150 $g/m^2$, in other embodiments at most 140 $g/m^2$, in other embodiments at most 100 $g/m^2$, in other embodiments at most 80 $g/m^2$.

Manufacture of Membrane Assembly

In one or more embodiments, where the membrane assembly includes a fabric reinforcement laminated or sandwiched between layers of plastic material, and the fabric reinforcement carries or has disposed thereon expandable graphite, the manufacture of the membrane requires that the expandable graphite be deposited on the fabric prior to manufacture of the membrane. On the other hand, where a membrane includes a fabric backing that carries expandable graphite, the expandable graphite may be deposited in the fabric prior to attachment of the fabric to the membrane or, in other embodiments, after the fabric is attached to the membrane.

The expandable graphite can be deposited on the fabric substrate (e.g., substrate 30 or substrate 44) by using a variety of techniques. In a first embodiment, the expandable graphite is formulated into a coating composition by combining the expandable graphite with a binder. This binder can be applied in the form of a wet coating to the fabric. In other embodiments, the binder is applied to the fabric exclusive of the expandable graphite, and following application of the binder to the fabric, and within sufficient time that the binder retains some level of tack or flowability to receive the expandable graphite, the expandable graphite is deposited on the binder, which thereby serves to adhere the expandable graphite to the fabric substrate.

Besides the foregoing, the membranes of the present invention can be prepared using conventional techniques. For example, methods for extruding thermoplastic sheet and laminating thermoplastic sheets to one another, optionally together with a reinforcing scrim, are known in the art. Likewise, methods for attaching a fabric backing, such as a fleece backing, to a thermoplastic membrane are known in the art.

Installation of Membrane Assembly

In one or more embodiments, as suggested above, the membranes of the present invention can be secured to a roof deck using a variety of techniques, all of which are known in the art. Accordingly, the skilled person will be able to install the membranes of this invention to form a Class A roofing system without undue calculation or experimentation.

Various modifications and alterations that do not depart from the scope and spirit of this invention will become apparent to those skilled in the art. This invention is not to be duly limited to the illustrative embodiments set forth herein.

What is claimed is:

1. A membrane composite comprising:
   (a) a thermoplastic membrane having first and second planar surfaces, where said thermoplastic membrane includes a first thermoplastic layer and a second thermoplastic layer with a reinforcing scrim located between said first thermoplastic layer and said second thermoplastic layer; and
   (b) a fabric secured through heat welding to at least a portion of the second planar surface of the membrane, where the fabric includes first and second surfaces, where the first planar surface of the fabric is attached to the second planar surface of the membrane, where the second planar surface of the fabric has a coating composition disposed thereon, where the coating composition includes expandable graphite dispersed within a binder.

2. The membrane composite of claim 1, where the fabric is in the form of a backing attached to the membrane.

3. The membrane composite of claim 1, where the fabric is a fleece.

4. The membrane composite of claim 1, where the fabric is a glass mat.

5. The membrane composite of claim 1, where said first and second thermoplastic layers have a thickness from about 15 to about 70 mils.

6. The membrane composite of claim 1, where the fabric is secured to the thermoplastic membrane by being at least partially embedded into the second planar surface of the thermoplastic membrane.

7. The membrane composite of claim 1, where a lap edge of said second planar surface of said thermoplastic membrane having the fabric secured thereto remains exposed to thereby provide a weldable surface without said fabric.

8. The membrane composite of claim 1, where said expandable graphite in said coating layer is expanded to at most 10% beyond its original unexpanded size.

9. The membrane composite of claim 1, wherein the composite is in the form of a roll.

* * * * *